United States Patent [19]
Harde et al.

[11] Patent Number: 5,538,039
[45] Date of Patent: Jul. 23, 1996

[54] VENT ARRANGEMENT FOR FUEL FILLER PIPES

[75] Inventors: Bo T. S. Harde, Göteborg; Karl-Olof Börjesson, Mölndal; Göran Bredal, Borås, all of Sweden

[73] Assignee: AB Volvo, Sweden

[21] Appl. No.: 244,829

[22] PCT Filed: Dec. 18, 1992

[86] PCT No.: PCT/SE92/00893

§ 371 Date: Aug. 12, 1994

§ 102(e) Date: Aug. 12, 1994

[87] PCT Pub. No.: WO93/11958

PCT Pub. Date: Jun. 24, 1993

[30] Foreign Application Priority Data

Dec. 18, 1991 [SE] Sweden ................................ 9103746

[51] Int. Cl.[6] .................................................. B65D 25/00
[52] U.S. Cl. ............................ 137/592; 141/59; 220/86.2
[58] Field of Search .......................... 220/86.2; 141/59; 137/592

[56] References Cited

U.S. PATENT DOCUMENTS

| | | | |
|---|---|---|---|
| 3,180,376 | 4/1965 | Sanborn | 137/592 |
| 4,441,533 | 4/1984 | Snyder et al. | 141/59 |
| 4,700,864 | 10/1987 | Galles et al. | |
| 4,724,861 | 2/1988 | Covert et al. | 141/59 |
| 4,747,508 | 5/1988 | Sherwood | 141/59 |
| 4,759,458 | 7/1988 | Fischer . | |
| 4,821,908 | 4/1989 | Yost | 220/86.2 |
| 4,917,145 | 4/1990 | Wawra et al. | 141/59 |

FOREIGN PATENT DOCUMENTS

| | | | |
|---|---|---|---|
| 21456 | 6/1920 | France | 220/86.2 |
| 2233636 | 1/1991 | United Kingdom . | |

*Primary Examiner*—A. Michael Chambers
*Attorney, Agent, or Firm*—Lerner, David, Littenberg, Krumholz & Mentlik

[57] ABSTRACT

A vent arrangement for a fuel filler pipe (11) for motor vehicles. The arrangement comprises a vent passage (12) between a fuel tank's (10) upper part and the upper part of the fuel filler pipe (11). The passage comprises a chamber (16), the volume of which exceeds the fuel volume which can be forced upwards in the passage during filling. The chamber (16) is formed as a widening of the passage (12) which beneath the chamber forms a combined riser and vent tube (12a) in relation to the fuel tank (10). The passage above the chamber forms a vent tube (12b). The combined riser and vent tube (12a) has its orifice a small way inside the chamber (16). The tube presents a drainage hole (18) proximate the inside of the chamber wall.

4 Claims, 1 Drawing Sheet

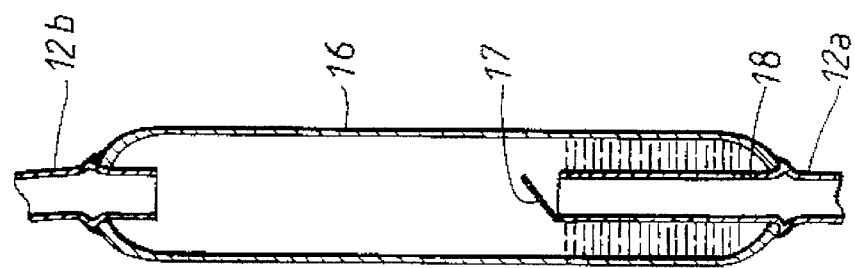
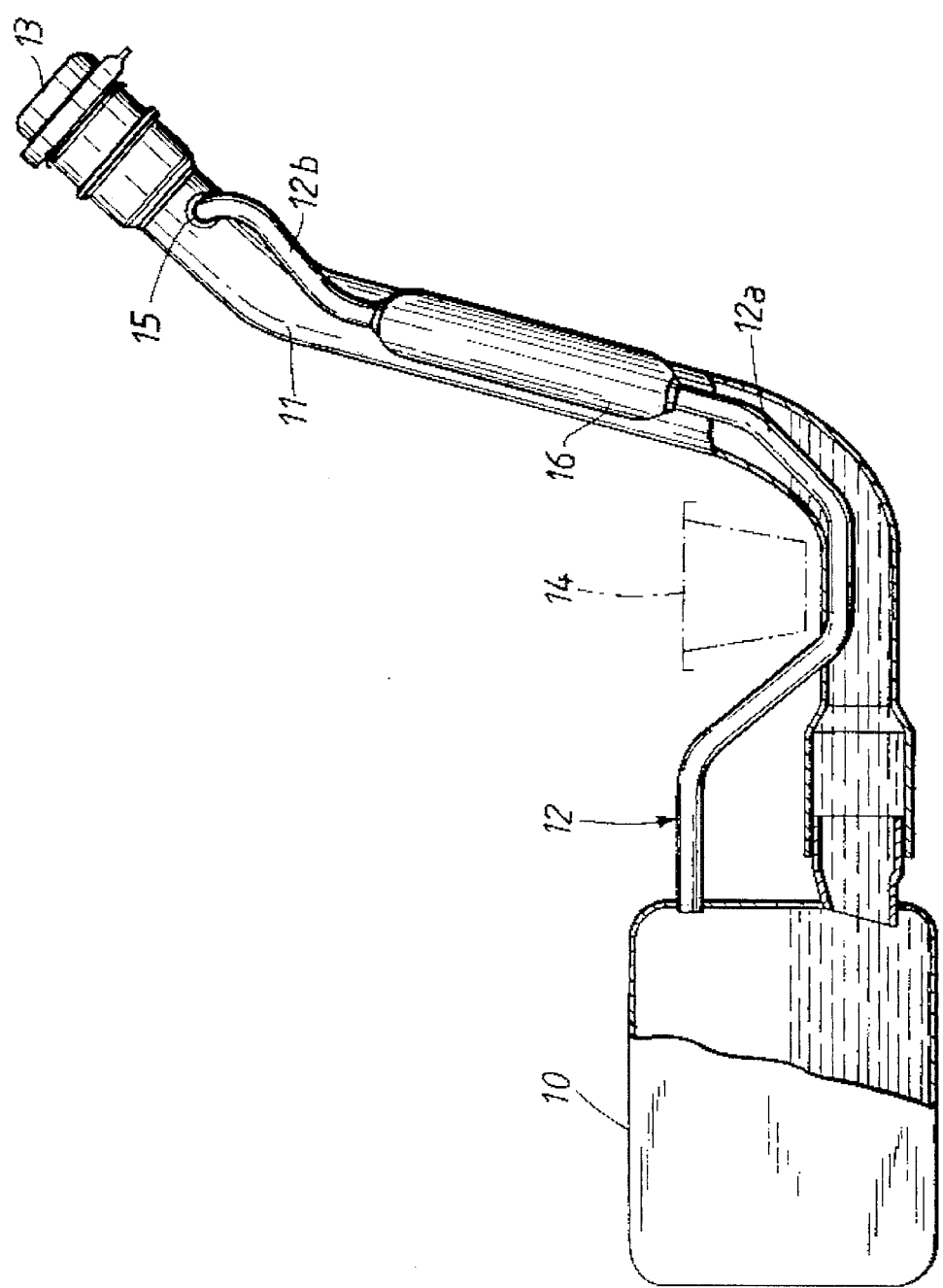

VENT ARRANGEMENT FOR FUEL FILLER PIPES

FIELD OF THE INVENTION

The present invention relates to a vent arrangement for fuel filler pipes in motor vehicles, which arrangement comprises a vent passage between a fuel tank's upper part and the upper part of the fuel filler pipe, which passage comprises a chamber, the volume of which exceeds the fuel volume which can be forced upwards in the passage during filling, whereby the chamber is formed as a widening of the passage and the passage beneath the chamber forms a combined riser and vent tube in relation to the fuel tank, whereby the passage above the chamber forms a vent tube.

STATE OF THE ART

It is well known that it can sometimes be difficult to fill cars' fuel tanks with fuel. This occurs generally due to the fact that the automatic filling-stop which is integrated into the stationary pump arrangement's filling nozzle is often so sensitive that the occurrence of even a small bit of fuel in the filler pipe is regarded by the filling-stop as an indication that the tank is full, with the result that the filling is automatically stopped.

Sensitive filling-stops are in themselves desirable since they contribute to reducing the risk of environmentally damaging leakage. The reason that the problem has now arisen is mainly because the fuel tank, for reasons of safety, is generally placed above or in front of the back axle. Because of this, again due to safety reasons, one is forced to place the filler tube under the structural member (beam) construction which runs in the car's longitudinal direction. In turn this requires that a vent tube is arranged so as to allow evacuation of air/gas from the tank during filling.

Since said "air" in the tank is saturated with fuel vapour, the vent tube is normally arranged parallel to the filler pipe so that the vent tube can have its orifice close to the filler pipe's orifice, whereby the fuel vapour can be recycled via a protector-sleeve with suction means, which protector sleeve is arranged on the filling nozzle. Even the vent tube is therefore normally arranged under the beam construction. This implies also that when the tank is full, fuel passes into the vent tube and collects in its lower bend. This fuel will be sucked back into the tank to a certain degree at the same time as the level in this drops. However, a remaining quantity of fuel often has to be forced upwards to the orifice of the filling tube by the incoming fuel before normal venting can start.

DE-OS 2254892 describes a vent arrangement with a vessel having a volume sufficient to contain the fuel which is forced upwardly from the vent tube's lower end during filling. The vessel is provided with a drainage tube which returns the fuel to the tank. One disadvantage with this arrangement is that it requires an extra connection to the tank which makes both the whole structure and its fitment more costly.

TECHNICAL PROBLEM

An object of the present invention is thus to arrive at a vent arrangement which solves the problems of filling nozzles having a filling-stop and moreover is easier to build into a modern car construction.

SOLUTION

This object is achieved according to the invention in that the combined riser and vent tube has its orifice a small way inside the chamber and in that said tube presents a drainage hole proximate the inside of the chamber wall.

Preferred embodiments of the invention are defined in the appended sub-claims.

DESCRIPTION OF THE DRAWINGS

An embodiment of the invention will now be described more closely with reference to the accompanying drawings, in which FIG. 1 shows a schematic view of a fuel tank in side view with a filler pipe and a vent arrangement according to the invention, and FIG. 2 shows, on an enlarged scale, a chamber included in the vent arrangement.

PREFERRED EMBODIMENTS

In FIG. 1 reference 10 denotes a schematically depicted fuel tank which is provided with a filler pipe 11 and a vent arrangement 12. The tank is viewed from the front and in the longitudinal direction of the car. The reference 13 denotes the fuel cap for the filler pipe.

A structural member (beam) 14 of the car's chassis extends in the longitudinal direction of the car and the vent tube 12 has to be lead from the upper part of the tank in a curve under this structural member and upwards to a connection 15 proximate the filler pipe's upper part.

The vent tube 12 is widened out above the structural member 14 into a chamber 16 which is shown in more detail in FIG. 2. The chamber's volume is sufficient to contain the quantity of fuel which can be forced upwards via the vent tube during filling.

The intention with this design of vent tube is that the chamber shall serve as a fluid lock, so that only air can pass through the part of the vent tube which extends between the upper part of the chamber and the connection 15. To achieve this object, the chamber is provided with a splash protector, so that fluid is not able to pass from the tube portion at the lower end of the chamber to the tube portion at the opposite end.

The tube portion 12a below the chamber 16 consequently forms a combined riser and vent tube in relation to the fuel tank, with only one vent tube 12b above the chamber.

The tube portion 12a has its orifice a small way inside the chamber 16 and is provided with a deflector plate 17 which is arranged to direct the fluid, coming from below, obliquely outwardly towards the inside of the chamber wall. The tube portion 12b also has its orifice a small way inside the chamber.

The fluid which flows out of the tube portion 12a is able to use up its kinetic energy whilst travelling upwardly along the inside of the chamber wall, but will be turned downwardly if it reaches as high as the top of the chamber. A drainage hole in the tube portion 12a proximate the bottom of the chamber allows return of fuel which has collected in the chamber between the inwardly projecting part of tube 12a and the inside of the chamber.

The invention is not limited to the embodiments described above but can be varied within the scope of the appended claims. For example, the chamber 16 can be formed in a different manner than that shown.

We claim:

1. A vent arrangement for a fuel filler pipe of a motor vehicle, comprising:

a fuel tank, said fuel tank having at least an upper part, a fuel filler pipe, said fuel filler pipe formed with at least a top part thereof, a vent passage connecting said upper part of the fuel tank with said top part of the filler pipe; said vent passage including a chamber consisting of an interior, upper and lower parts, said chamber having volume exceeding volume of a fuel forced through said vent passage upon filling of said fuel tank, said chamber being situated within said vent passage so that a first portion of said vent passage connected to said upper part of said chamber forms a part of a vent tube and a second portion of said vent passage adjacent a lower part of said chamber is a combination of a riser for said fuel and said vent tube, said second portion of the vent passage extending into said interior of said chamber is formed with a drainage hole positioned proximately to said interior of said chamber.

2. The vent arrangement of claim 1, wherein said first portion of said vent passage extends within said interior of said chamber.

3. The vent arrangement of claim 1, wherein said chamber further comprises a splash trap preventing splashing said fuel from said second portion of the vent passage to said first portion of the vent passage.

4. The vent arrangement according to claim 3, wherein said splash trap is a deflector plate positioned at a free end of said second portion of the vent passage.

* * * * *